United States Patent
Addepalli et al.

(10) Patent No.: US 9,924,360 B2
(45) Date of Patent: *Mar. 20, 2018

(54) AT COMMAND FOR SECURE ESM INFORMATION

(71) Applicant: INTEL IP CORPORATION, Santa Clara, CA (US)

(72) Inventors: Kiran Kumar Addepalli, Bangalore (IN); Robert Zaus, München (DE); Vivek Gupta, San Jose, CA (US)

(73) Assignee: INTEL IP CORPORATION, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/628,246

(22) Filed: Jun. 20, 2017

(65) Prior Publication Data
US 2017/0289802 A1    Oct. 5, 2017

Related U.S. Application Data

(63) Continuation of application No. 14/701,520, filed on Apr. 30, 2015.

(51) Int. Cl.
| | |
|---|---|
| *H04W 12/06* | (2009.01) |
| *H04W 12/00* | (2009.01) |
| *H04L 29/06* | (2006.01) |
| *H04W 48/20* | (2009.01) |
| *H04W 12/08* | (2009.01) |

(52) U.S. Cl.
CPC ........... *H04W 12/06* (2013.01); *H04L 63/083* (2013.01); *H04W 12/00* (2013.01); *H04W 12/08* (2013.01); *H04W 48/20* (2013.01)

(58) Field of Classification Search
CPC ............................. H04W 12/06; H04L 63/083
(Continued)

(56) References Cited

U.S. PATENT DOCUMENTS

| | | | |
|---|---|---|---|
| 2012/0246325 A1* | 9/2012 | Pancorbo Marcos . | H04L 63/102 709/227 |
| 2013/0003576 A1 | 1/2013 | Segura et al. | |

(Continued)

OTHER PUBLICATIONS

U.S. Appl. No. 14/701,520, Non-Final Office Action, dated Aug. 11, 2016, 22 pages.

(Continued)

*Primary Examiner* — Carl Colin
*Assistant Examiner* — Dereena Cattungal
(74) *Attorney, Agent, or Firm* — Stoel Rives LLP

(57) ABSTRACT

Systems and methods for transmitting AT commands indicating whether Evolved Packet System (EPS) Session Management (ESM) information should be transmitted securely are disclosed herein. A Terminal Equipment (TE) may transmit an AT command to a Mobile Termination (MT). The AT command may indicate whether protocol configuration options (PCO) should be ciphered and/or whether an access point name (APN) is provided. In some embodiments, the AT command may be a dedicated command and may only include a <securePCO> parameter and an <APN-provided> parameter. Alternatively, or in addition, the AT command may include a <securePCO> parameter, an <APN> parameter, and/or additional parameters serving additional functions. Whether the APN is provided may be determined based on whether the <APN> parameter is present and includes a non-null value. The AT command may be related to a single packet data network (PDN) connection or may relate to a plurality of PDN connections.

16 Claims, 10 Drawing Sheets

(58) Field of Classification Search
USPC .................................................... 726/5
See application file for complete search history.

(56) References Cited

U.S. PATENT DOCUMENTS

| | | | | |
|---|---|---|---|---|
| 2013/0279402 | A1* | 10/2013 | Chuang | H04W 76/022 370/328 |
| 2013/0290722 | A1* | 10/2013 | Kall | H04L 12/4633 713/171 |
| 2014/0016614 | A1* | 1/2014 | Velev | H04W 4/005 370/331 |
| 2014/0219165 | A1* | 8/2014 | Lin | H04W 48/16 370/328 |
| 2016/0218988 | A1* | 7/2016 | Huang-Fu | H04L 29/08 |

OTHER PUBLICATIONS

U.S. Appl. No. 14/701,520, Notice of Allowance, dated Mar. 27, 2017, 17 pages.

3GPP TS 24.301, "3rd Generation Partnership Project; Technical Specification Group Core Network and Terminals; Non-Access-Stratum (NAS) protocol for Evolved Packet System (EPS); Stage 3", (Release 13) V13.1.0, Mar. 2015, 384 pages.

3GPP TS 27.007, "3rd Generation Partnership Project; Technical Specification Group Core Network and Terminals; AT command set for User Equipment (UE)", (Release 12) V.12.7.0, Dec. 2014, 319 pages.

3GPP TS 27.007, "3rd Generation Partnership Project; Technical Specification Group Core Network and Terminals; AT command set for User Equipment (UE) (Release 13)", V13.0.0, Mar. 2015, 327 pages.

3GPP TS 27.007, "3rd Generation Partnership Project; Technical Specification Group Core Network and Terminals; AT command set for User Equipment (UE) (Release12)", V12.8.0, Mar. 2015, 76 pages.

Intel, "Updates to +CGDCONT to allow security protected transmission of ESM information", C1-144815 Change Request 27.007—3GPP TSG-CT WG1 Meeting #89,San Francisco, California, USA, Nov. 16-20, 2014, 5 pages.

PCT/US2016/022172, International Search Report and Written Opinion, dated Jun. 13, 2016, 14 pages.

* cited by examiner

AT COMMAND FOR SECURE ESM INFORMATION

RELATED APPLICATIONS

This application is a continuation of U.S. patent application Ser. No. 14/701,520 filed Apr. 30, 2015, which is hereby incorporated by reference herein in its entirety.

TECHNICAL FIELD

The present disclosure relates to an Attention (AT) command to indicate that transmission of Evolved Packet System (EPS) Session Management (ESM) information should be ciphered.

DETAILED DESCRIPTION OF PREFERRED EMBODIMENTS

Figure 1:
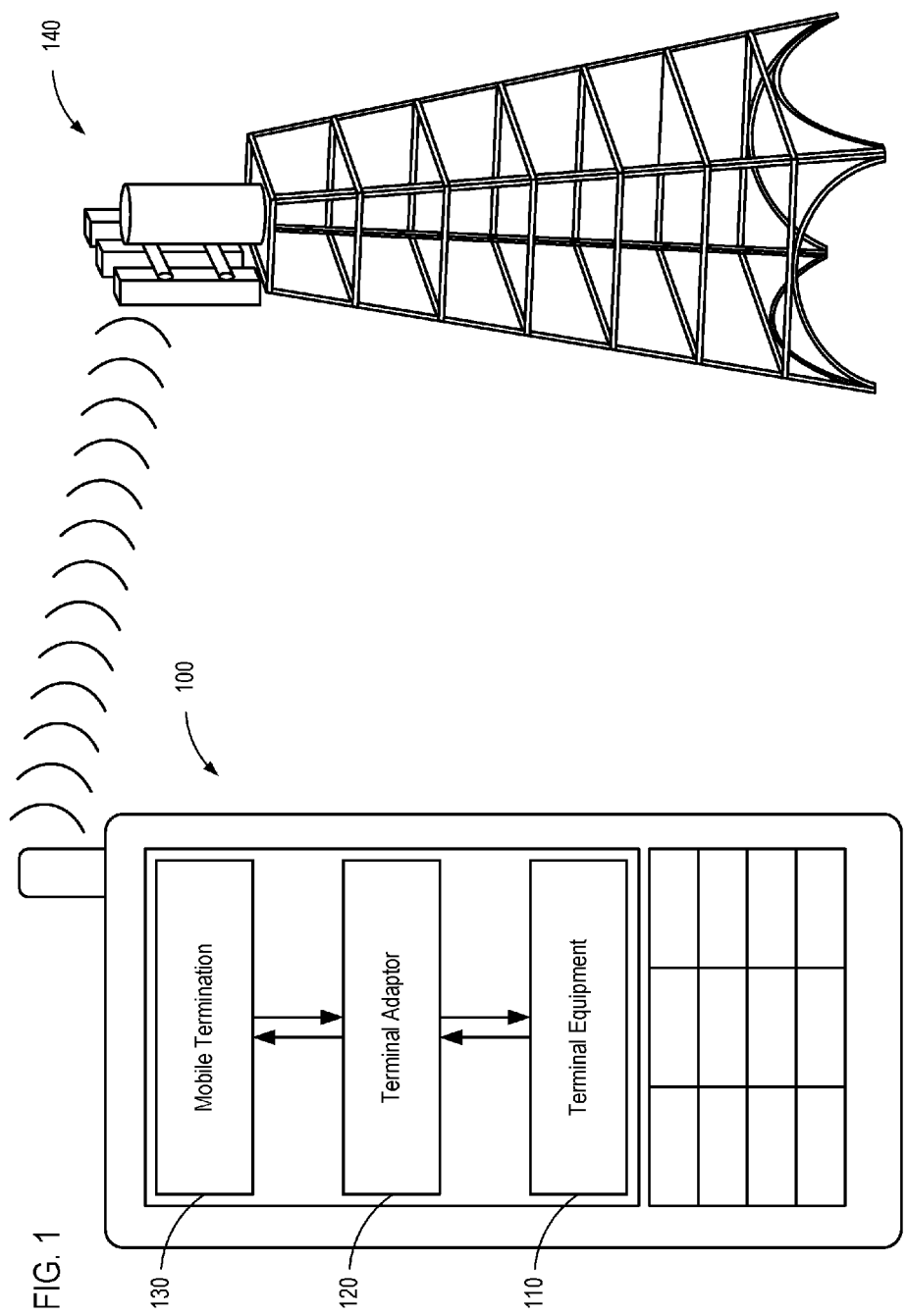
FIG. 1 is a schematic diagram of an embodiment of a User Equipment (UE) communicatively coupling to an Evolved NodeB (eNB).

Wireless mobile communication technology uses various standards and protocols to transmit data between a base station and a wireless communication device. Wireless communication system standards and protocols can include, for example, the 3rd Generation Partnership Project (3GPP) long term evolution (LTE); the Institute of Electrical and Electronics Engineers (IEEE) 802.16 standard, which is commonly known to industry groups as worldwide interoperability for microwave access (WiMAX); and the IEEE 802.11 standard, which is commonly known to industry groups as Wireless Local Area Network (WLAN) or Wi-Fi. In a 3GPP LTE network, an evolved packet system (EPS) may include at least a radio access network (RAN) and an evolved packet core (EPC). In 3GPP RANs in LTE systems, a base station may include Evolved Universal Terrestrial Radio Access Network (E-UTRAN) Node Bs (also commonly denoted as evolved Node Bs, enhanced Node Bs, eNodeBs, or eNBs), which communicate with a wireless communication device, known as user equipment (UE). In LTE networks, an E-UTRAN may include a plurality of eNodeBs and may communicate with a plurality of UEs. An EPC may communicatively couple the E-UTRAN to an external network, such as the Internet. LTE networks include radio access technology (RAT) and core radio network architecture that can provide high data rate, low latency, packet optimization, and improved system capacity and coverage.

When first coupling to the E-UTRAN, the UE may send an attach request message as well as a packet data network (PDN) connectivity request message. In some embodiments, the UE may not include an access point name (APN) in the PDN connectivity request and/or attach request. If the UE needs to provide protocol configuration options (PCO) that require ciphering and/or needs to provide an APN, the PDN connectivity request may include an EPS session management (ESM) information transfer flag. A mobility management entity (MME) in the EPC may at a later stage in the PDN connectivity procedure initiate an ESM information request procedure when ciphering has been activated. The UE can provide the MME with the PCO and/or the APN during the ESM information request procedure.

If a Terminal Equipment (TE) is unable to indicate to a Mobile Termination (MT) whether ciphering of ESM information is required, the MT may not know whether to set the ESM information transfer flag. As a result, the MME may also not know whether ciphering of ESM information is required. It may be difficult for the non-access stratum (NAS) to determine whether any of the Internet Engineering Task Force (IETF) protocol data units (PDUs) to be included in the PCO is a password authentication protocol (PAP) PDU or challenge handshake authentication protocol (CHAP) PDU containing a password that would need ciphering to be active before transmission. Alternatively, or in addition, the MT may need to process the contents of the PCO to determine whether security protected transmission is required or not.

The TE may transmit an AT command to the MT that indicates whether ciphering of the PCO is needed and/or whether the APN will be included in a transmission. For example, the AT command may be a dedicated command that includes two flags: one to indicate ciphering of the PCO and one to indicate inclusion of the APN. In some embodiments, the dedicated command may only include the two flags and/or may only include information related to the ciphering of the PCO and/or the inclusion of the APN. In other embodiments, an AT command that also provides other information and/or has a different function may include parameters related to the ciphering of the PCO and/or the inclusion of the APN. For example, a +CGDCONT command may include a parameter indicating whether to cipher the PCO and/or a parameter indicating whether to include the APN. The secure PCO transmission setting may be considered as being specific for each individual PDN connection. Accordingly, the +CGDCONT command may be used rather than having a global setting that would apply to activation of every single PDN connection.

The dedicated command that includes parameters related to ciphering of the PCO and inclusion of the APN may be a +CGSPTESMI command. In an embodiment, the syntax of the +CGSPTESMI command may be defined as follows:

TABLE 1

Security Protected Transmission of ESM Information +CGSPTESMI
+CGSPTESMI parameter command syntax

| Command | Possible response(s) |
|---|---|
| +CGSPTESMI=[<securePCO>[, <APNprovided>]] | +CME ERROR: <err> |
| +CGSPTESMI? | +CGSPTESMI: <securePCO>, <APNprovided> |
| +CGSPTESMI=? | +CGSPTESMI: (range of supported <securePCO>s), (range of supported <APNprovided>s) |

The set command may allow the TE to specify whether security protected transmission of ESM information is requested (e.g., because the PCO includes information that requires ciphering). There may also be other reasons for the UE to use security protected transmission of ESM information, e.g., if the UE needs to transfer an APN. The read command may return the current setting for security protected transmission of ESM information. The test command may return values supported as compound values. In an embodiment, the parameters may include the following defined values:

<securePCO>: integer type. Specifies security protected transmission of PCO is requested or not
  0 Security protected transmission of PCO is not requested
  1 Security protected transmission of PCO is requested <APNprovided>: integer type. Specifies whether the application is also providing an APN (e.g., by way of AT command +CGDCONT)
  0 APN is not provided
  1 APN is provided The +CGDCONT command may include a secure PCO transmission setting specific to each individual PDN connection rather than having one global setting that would apply to activation of every single PDN connection. The inclusion of the secure PCO transmission setting in the +CGDCONT command may allow the setting to apply individually to the activation of a single PDN connection. In an embodiment, the syntax of the +CGDCONT command may be defined as follows:

TABLE 2

Define Packet Data Protocol (PDP) Context +CGDCONT
+CGDCONT parameter command syntax

| Command | Possible Response(s) |
|---|---|
| +CGDCONT=[<cid>[,<PDP_type>[,<APN>[, <PDP_addr>[,<d_comp>[,<h_comp>[, <IPv4AddrAlloc>[,<request_type>[, <P-CSCF_discovery[, <IM_CN_Signalling_Flag_Ind>[,<NSLPI>[, <securePCO>]]]]]]]]]]]] | |
| +CGDCONT? | [+CGDCONT: <cid>,<PDP_type>,<APN>, <PDP_addr>,<d_comp>,<h_comp>[, <IPv4AddrAlloc>[,<request_type>[, <P-CSCF_discovery>[, <IM_CN_Signalling_Flag_ind>[,<NSLPI>[, <securePCO>]]]]]] [<CR><LF>+CGDCONT: <cid>,<PDP_type>, <APN>,<PDP_addr>,<d_comp>,<h_comp>[, <IPv4AddrAlloc>[,<request_type>[, <P-CSCF_discovery>[, <IM_CN_Signalling_Flag_ind>[,<NSLPI>[, <securePCO>]]]]] [...]] |
| +CGDCONT=? | +CGDCONT: (range of supported <cid>s), <PDP_type>,,, (list of supported <d_comp>s), (list of supported <h_comp>s), (list of supported <IPv4AddrAlloc>s), (list of supported <request_type>s), (list of supported <P-CSCF_discovery>s), (list of supported <IM_CN_Signalling_Flag_Ind>s), (list of supported <NSLPI>s), (range of supported <securePCO>s) [<CR><LF>+CGDCONT: (range of supported <cid>s), <PDP_type>,,,(list of supported <d_comp>s), (list of supported <h_comp>s), (list of supported <IPv4AddrAlloc>s), (list of supported <request_type>s), (list of supported <P-CSCF_discovery>s), (list of supported <IM_CN_Signalling_Flag_Ind>s), (list of supported <NSLPI>s), (range of supported <securePCO>s) [...]] |

The set command may specify PDP context parameter values for a PDP context identified by the (local) context identification parameter, <cid>, and may also allow the TE to specify whether security protected transmission of ESM information is requested (e.g., because the PCO includes information that requires ciphering). There can be other reasons for the UE to use security protected transmission of ESM information, e.g. if the UE needs to transfer an APN. The number of PDP contexts that may be in a defined state at the same time may be given by the range returned by the test command. For EPS, the PDN connection and its associated EPS default bearer may be identified with the +CGDCONT. A special form of the set command, +CGDCONT=<cid> may cause the values for context number <cid> to become undefined. In some embodiments, if the initial PDP context is supported, the context with <cid>=0 may be automatically defined at startup. As with all other contexts, the parameters for <cid>=0 may be modified with +CGDCONT. If the initial PDP context is supported, +CGDCONT=0 may reset context number 0 to its particular default settings. The read command may return current settings for each defined context. In an embodiment, the parameters may include the following defined values:

<cid>: integer type; specifies a particular PDP context definition. The parameter is local to the TE-MT interface and is used in other PDP context-related commands. The range of permitted values (minimum value=1 or if the initial PDP context is supported, minimum value=0) is returned by the test form of the command.

<PDP_type>: string type; specifies the type of packet data protocol. The default value is manufacturer specific.
    X.25 ITU-T/CCITT X.25 layer 3
    IP Internet Protocol (IETF STD 5)
    IPV6 Internet Protocol, version 6
    IPV4V6 Virtual <PDP_type> introduced to handle dual IP stack UE capability.
    OSPIH Internet Hosted Octect Stream Protocol
    PPP Point to Point Protocol (IETF STD 51)

<APN>: string type; a logical name that is used to select the GGSN or the external packet data network.

<PDP_addr>: string type; identifies the MT in the address space applicable to the PDP.

<d_comp>: integer type; controls PDP data compression.
    0 off
    1 on (manufacturer preferred compression)
    2 V.42bis
    3 V.44

<h_comp>: integer type; controls PDP header compression.
    0 off
    1 on (manufacturer preferred compression)
    2 RFC 1144 (applicable for SNDCP only)
    3 RFC 2507
    4 RFC 3095 (applicable for PDCP only)

<IPv4AddrAlloc>: integer type; controls how the MT/TA requests to get the IPv4 address information
    0 IPv4 address allocation through NAS signalling
    1 IPv4 address allocated through DHCP <request_type>: integer type; indicates the type of PDP context activation request for the PDP context. If the initial PDP context is supported it is not allowed to assign <cid>=0 for emergency bearer services. A separate PDP context must be established for emergency bearer services.
    0 PDP context is for new PDP context establishment or for handover from a non-3GPP access network (how the MT decides whether the PDP context is for new PDP context establishment or for handover is implementation specific)
    1 PDP context is for emergency bearer services
    2 PDP context is for new PDP context establishment
    3 PDP context is for handover from a non-3GPP access network <P-CSCF_discovery>: integer type; influences how the MT/TA requests to get the P-CSCF address.
    0 Preference of P-CSCF address discovery not influenced by +CGDCONT
    1 Preference of P-CSCF address discovery through NAS signalling
    2 Preference of P-CSCF address discovery through DHCP <IM_CN_Signalling_Flag_Ind>: integer type; indicates to the network whether the PDP context is for IM CN subsystem-related signalling only or not.
    0 UE indicates that the PDP context is not for IM CN subsystem-related signalling only
    1 UE indicates that the PDP context is for IM CN subsystem-related signalling only <NSLPI>: integer type; indicates the NAS signalling priority requested for this PDP context:
    0 indicates that this PDP context is to be activated with the value for the low priority indicator configured in the MT.
    1 indicates that this PDP context is to be activated with the value for the low priority indicator set to "MS is not configured for NAS signalling low priority".

<securePCO>: integer type. Specifies if security protected transmission of PCO is requested or not.
    0 Security protected transmission of PCO is not requested
    1 Security protected transmission of PCO is requested Although the +CGDCONT command does not include the same parameters as the +CGSPTESMI command, similar behavior may still be achieved. For example, table 3 includes +CGDCONT commands for various situations and the corresponding behavior:

TABLE 3

| Application Desired Behavior | AT Command +CGSPTESMI | AT Command +CGDCONT | UE Action: In PDN Connectivity Request | UE Behavior When MME Initiates ESM Information Request Procedure |
|---|---|---|---|---|
| 1] No APN, ciphering of PCO not required | securePCO=False, APNProvided=False | No APN in +CGDCONT, securePCO=False | ESM Information Transfer Flag is not set, PCO is included | MME is not expected to initiate ESM information request procedure as ESM Information Transfer flag is not set in PDN connectivity request |

TABLE 3-continued

| Application Desired Behavior | AT Command +CGSPTESMI | AT Command +CGDCONT | UE Action: In PDN Connectivity Request | UE Behavior When MME Initiates ESM Information Request Procedure |
|---|---|---|---|---|
| 2] Include APN, ciphering of PCO not required | SecurePCO=False, APNProvided=True | Include APN in +CGDCONT, securePCO=False | ESM Information Transfer Flag is set, PCO is included | UE provides MME with PCO and APN in a ciphered ESM Information Response message (Note 1) |
| 3] Include APN, cipher PCO | SecurePCO=True, APNProvided=True | Include APN in +CGDCONT, securePCO=True | ESM Information Transfer Flag is set | UE provides MME with PCO and APN in a ciphered ESM Information Response message |
| 4] No APN, cipher PCO | SecurePCO=True, APNProvided=False | No APN in +CGDCONT, securePCO=True | ESM Information Transfer Flag is set | UE provides MME with PCO, but no APN, in a ciphered ESM Information Response message |

Note 1:
In some embodiments, if ciphering of PCO is not required, the UE will provide the PCO only in the PDN Connectivity Request message.

In Table 3, the <securePCO> flag may make a difference in case 4 as the ESM information transfer flag may now be included as opposed to not being included in the absence of the <securePCO> flag. In case 1, the ESM information transfer flag may not be included in the PDN Connectivity Request as opposed to possibly ambiguous behavior in the absence of a <securePCO> flag. In some embodiments, no changes may be needed to existing LTE communication protocols between UEs and eNBs.

An MT may support functions specific to management of a public land mobile network (PLMN) access interface (3GPP or non-3GPP), and may include, for example, a modem or other type of transceiver. A TE includes equipment that provides the functions necessary for the operation of the access protocols by the user (or a functional group on the user side of a user-network interface), and may include, for example, a computer or other device with processing functions (e.g., data terminal equipment). An MT and a TE may be in separate devices or within the same device. In a mobile phone, for example, the MT and TE may be enclosed within the same case, but the MT and TE functions may be performed by distinct processors. For example, an application processor may serve as a TE and a baseband processor may serve as an MT, where communication between the MT and TE takes place over a bus using AT commands (which serves as a terminal adaptor). By way of example, FIG. 1 is a schematic diagram of an embodiment of a UE 100 communicatively coupling to an eNB 140. The UE 100 may include a TE 110, an MT 130, and a Terminal Adaptor (TA) 120. The TA 120 may communicatively couple the TE 110 to the MT 130. In some embodiments, the TA 120 may be considered part of the MT 130. Alternatively, or in addition, the TA 120 may be omitted in some embodiments. The MT 130 may be configured to communicatively couple the UE 100 to the eNB 140. For example, the MT 130 may transmit attach requests, PDN connectivity requests, and/or the like to communicatively couple with the eNB 140 and to establish one or more bearers. The MT 130 may use the PDN connectivity requests to indicate via the eNB 140 to an MME (not shown) whether security protected transmission of ESM information is required (e.g., whether the MT 130 would like to transmit ciphered PCO and/or a ciphered APN). For example, the MT 130 may set an ESM information transfer flag in a PDN connectivity request if ciphering of the PCO and/or ciphering of the APN is desired for transmission.

The TE 110 may determine whether one or more applications operating on the UE 100 require security protected transmission of the PCO and/or transmission of an APN. The TE 110 may determine whether security protected transmission is globally required (e.g., at least one application needs it) or may determine for each PDN connection whether security protected transmission is required for that PDN connection. The TE 110 may transmit an AT command to the TA 120/MT 130 indicating whether security protected transmission is desired. Based on the AT command, the MT 130 may be able to determine whether to set the ESM information transfer flag in the PDN connectivity request. The AT command may be a dedicated AT command serving no other function than communicating whether to cipher the PCO and/or the APN. Alternatively, the AT command may serve multiple functions. The AT command may indicate whether security protected transmission should be used globally and/or may indicate whether security protected transmission should be used for a particular PDN connection.

Figure 2A:
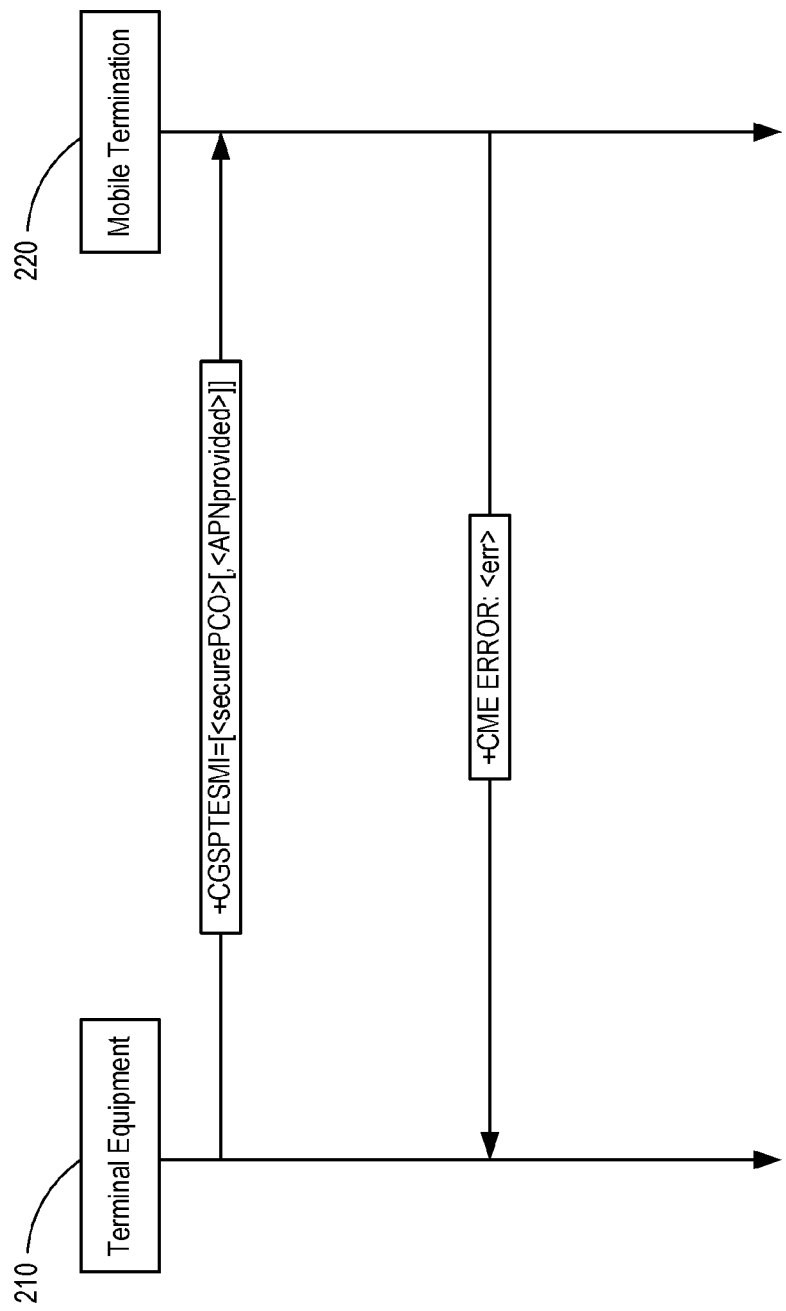
FIG. 2A is a schematic diagram of a transmission of a +CGSPTESMI set command from a Terminal Equipment (TE) to a Mobile Termination (MT).

FIG. 2A is a schematic diagram of a transmission of a +CGSPTESMI set command from a TE 210 to an MT 220. The +CGSPTESMI set command may include a <securePCO> parameter, which may indicate whether security protected transmission of PCO is requested. The set command may also include an <APNprovided> parameter, which may indicate whether an APN is provided. In the illustrated embodiment, the +CGSPTESMI set command may include the <securePCO> and <APNprovided> parameters and no other parameters. The TE 210 may determine the values of the parameters based on one or more applications requiring PDN connections and may transmit the +CGSPTESMI set command to the MT 220. After the +CGSPTESMI set command has been received by the MT 220, the MT 220 may indicate to an MME (not shown) whether security protected transmission of the PCO and/or APN is required based on the received +CGSPTESMI set command. The MT 220 may transmit an error message to the TE 210 if the +CGSPTESMI set command is not received correctly from the TE 210 and/or includes improper parameters.

Figure 2B:
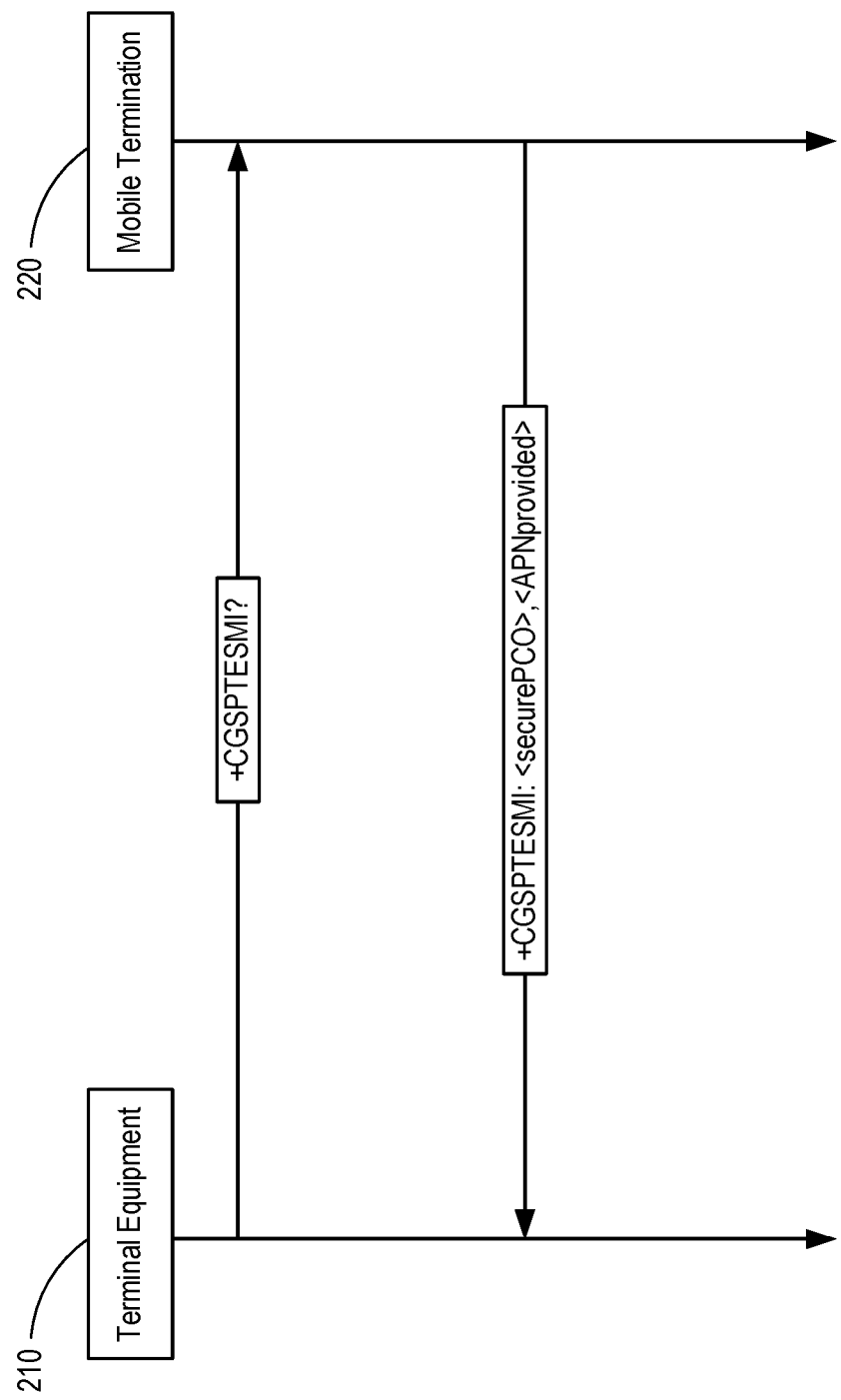
FIG. 2B is a schematic diagram of a transmission of a +CGSPTESMI read command from the TE to the MT.

FIG. 2B is a schematic diagram of a transmission of a +CGSPTESMI read command from the TE 210 to the MT 220. The +CGSPTESMI read command may request the current settings for security protected transmission of ESM information. The MT 220 may determine the values of the <securePCO> parameter, the <APNprovided> parameter, and/or the like. The MT 220 may transmit a response message that indicates the values of the parameters. For example, the TE 210 may transmit a set command setting the <securePCO> parameter and/or the <APNprovided> parameter, and the MT 220 may store the set values of the parameters. The MT 220 may look up the values of the parameters and transmit the values to the TE 210 in response to receiving the +CGSPTESMI read command.

Figure 2C:
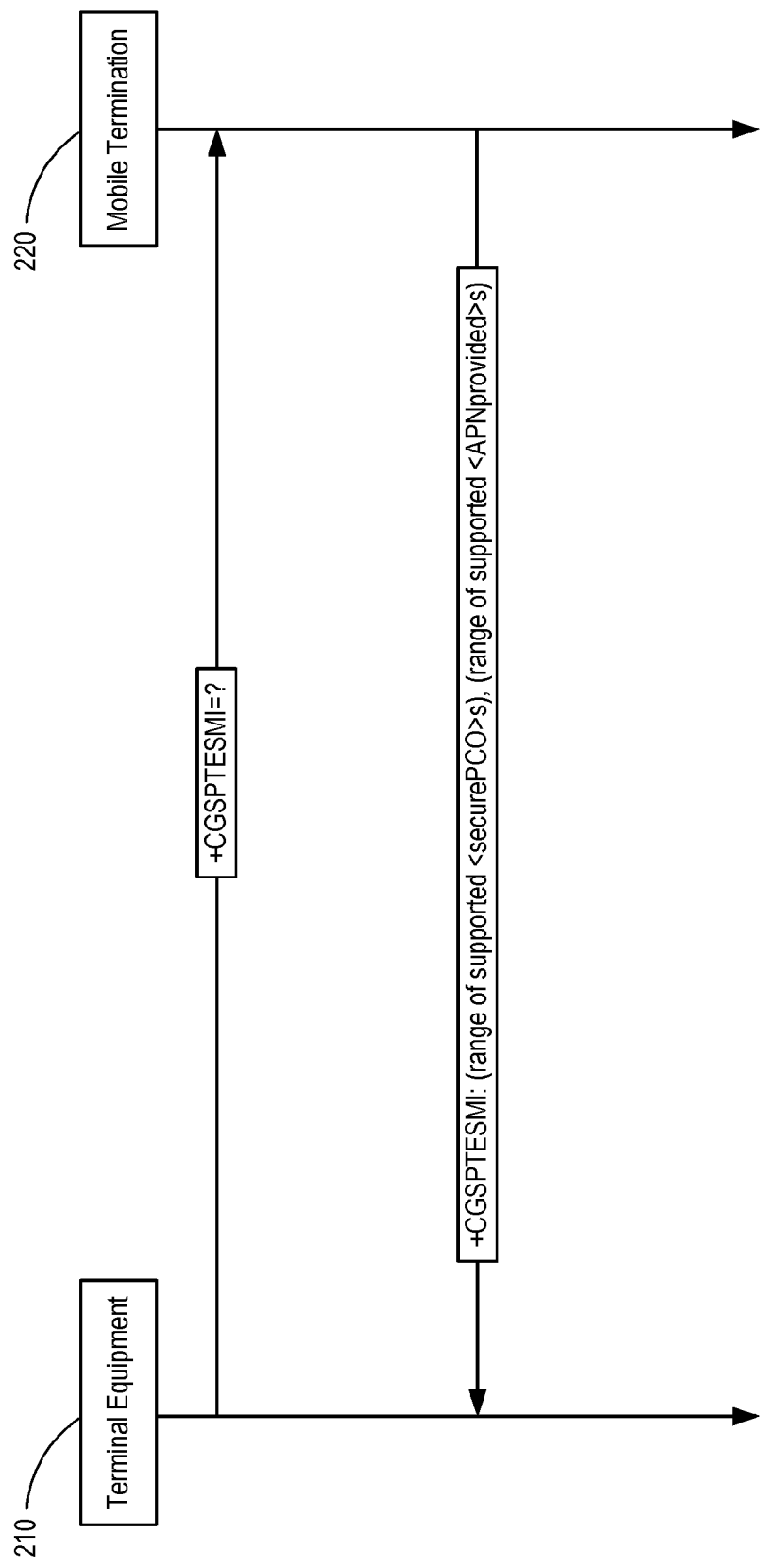
FIG. 2C is a schematic diagram of a transmission of a +CGSPTESMI test command from the TE to the MT.

FIG. 2C is a schematic diagram of a transmission of a +CGSPTESMI test command from the TE 210 to the MT 220. The +CGSPTESMI test command may request supported values for the +CGSPTESMI set command. The supported values may be predetermined/predefined and/or may be determined based on a current configuration of the MT 220. For example, in some embodiments, supported values for the <securePCO> and the <APNprovided> may only be zero and one, and the MT 220 may transmit a message indicating such to the TE 210.

Figure 3A:
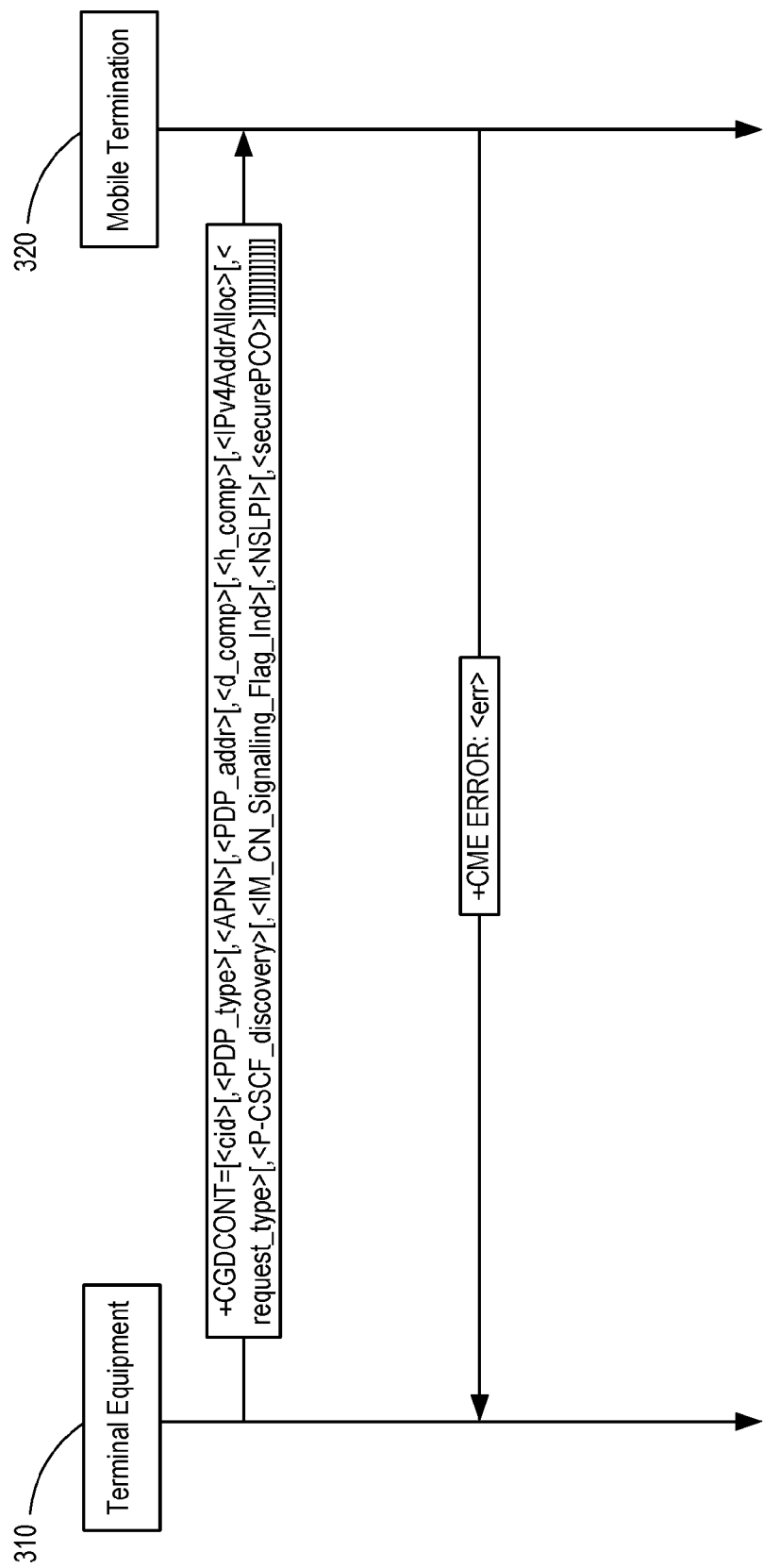
FIG. 3A is a schematic diagram of a transmission of a +CGDCONT set command from a TE to an MT.

FIG. 3A is a schematic diagram of a transmission of a +CGDCONT set command from a TE 310 to an MT 320. The +CGDCONT set command may include a <cid> parameter that may indicate the particular PDN connection to which the remaining parameters apply. The +CGDCONT set command may also include an <APN> parameter that may indicate a logical name of a gateway general packet radio service (GPRS) support node (GGSN) or external packet data network. In some embodiments, the +CGDCONT command may not include an <APNprovided> parameter. Rather, the MT 320 may determine based on whether the <APN> parameter is present and/or not null whether an APN is being provided. The +CGDCONT command may also include a <securePCO> parameter, which may indicate whether security protected transmission of PCO is requested. The +CGDCONT may also include various other parameters relating to the context identified by the <cid> parameter. The MT 320 may transmit an error message to the TE 310 if the +CGDCONT set command is not received correctly from the TE 310 and/or includes improper parameters.

The TE 310 may determine the values of the parameters, including the <APN> parameter and the <securePCO> parameter, based on applications associated with a PDN connection to which the +CGDCONT command relates. The MT 320 may receive the +CGDCONT command. The MT 320 may determine based on whether the <APN> parameter is null or omitted and the value of the <securePCO> parameter whether an ESM information transfer flag should be set in a PDN connectivity request. For example, if the <APN> parameter is present and not null or the <securePCO> parameter indicates security protected transmission of PCO is requested, the MT 320 may set the ESM information transfer flag.

Figure 3B:
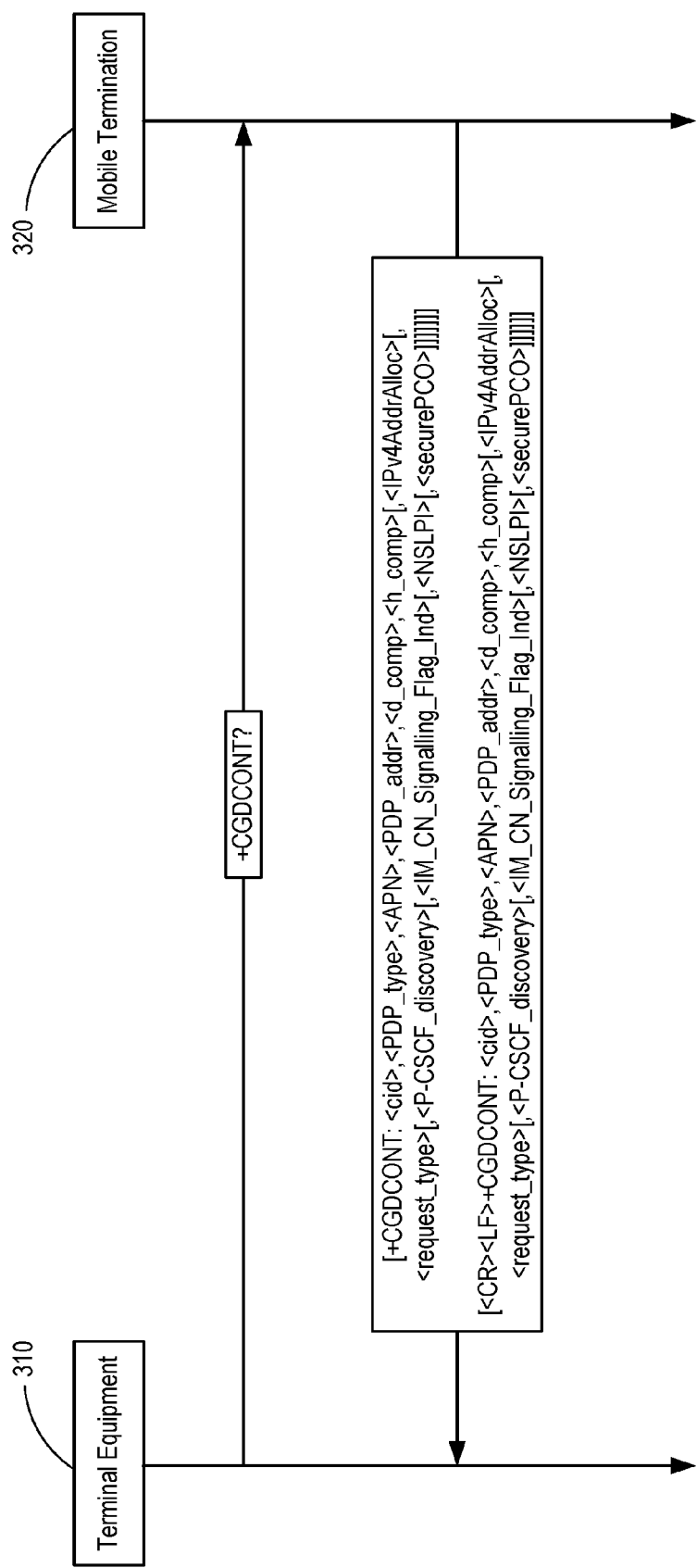
FIG. 3B is a schematic diagram of a transmission of a +CGDCONT read command from the TE to the MT.

FIG. 3B is a schematic diagram of a transmission of a +CGDCONT read command from the TE 310 to the MT 320. The +CGDCONT read command may request the current settings for each defined context. The MT 320 may determine the values of each parameter of each defined context and may transmit a response message indicating the values. For example, the TE 310 may have previously transmitted one or more +CGDCONT set commands defining the values of one or more parameters of the +CGDCONT set command. The MT 320 may store the values of the parameters and may transmit those values back to the TE 310 in response to receiving the +CGDCONT read command.

Figure 3C:
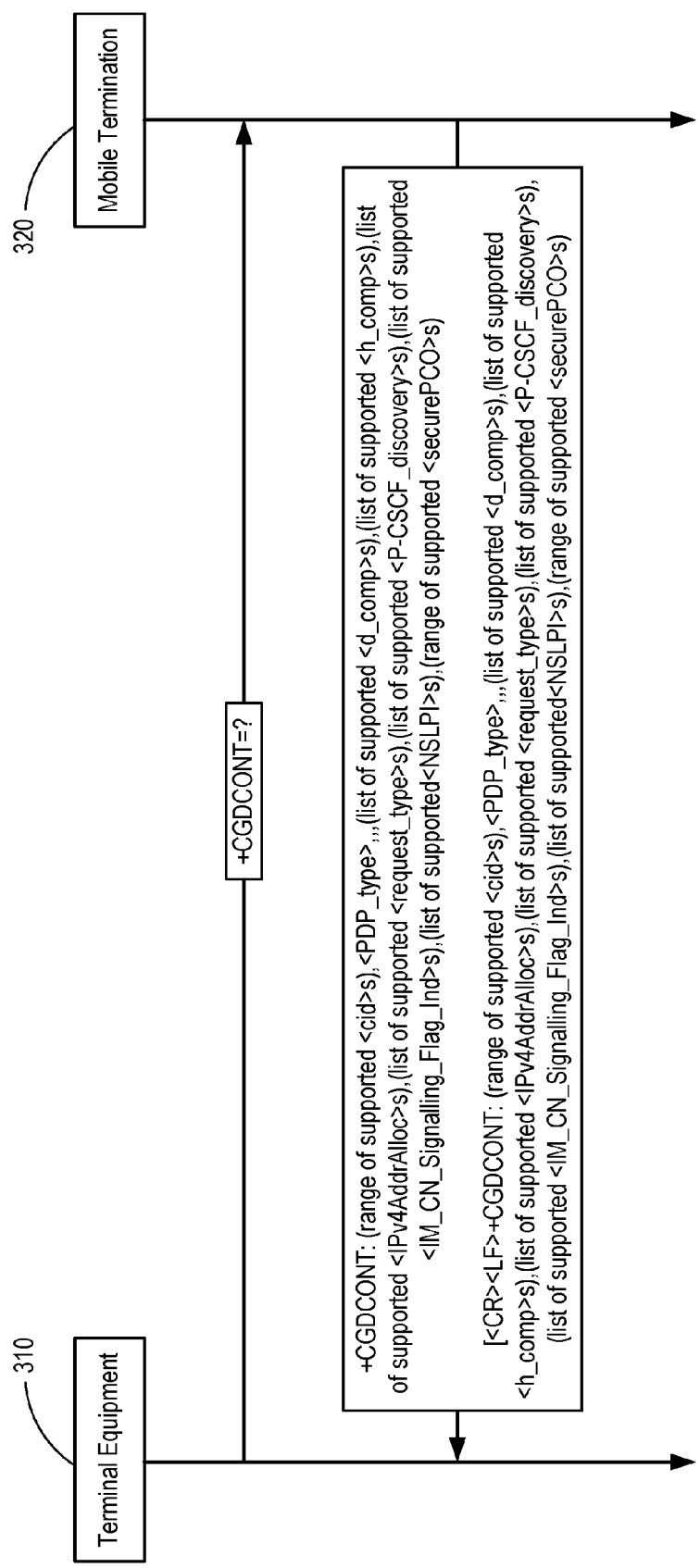
FIG. 3C is a schematic diagram of a transmission of a +CGDCONT test command from the TE to the MT.

FIG. 3C is a schematic diagram of a transmission of a +CGDCONT test command from the TE 310 to the MT 320. The +CGDCONT test command may request supported values for the +CGDCONT set command. The supported values may be predetermined/predefined and/or may vary from one context to another and be determined based on a current configuration of the MT 320. For example, in some embodiments, the <cid> parameter may support integers, the <APN> parameter may support strings, and the <securePCO> may support an integer with a value of zero or one. The MT 320 may respond to the +CGDCONT test command by transmitting a message to the TE 310 indicating the supported values for each parameter of the +CGDCONT set command.

Figure 4:
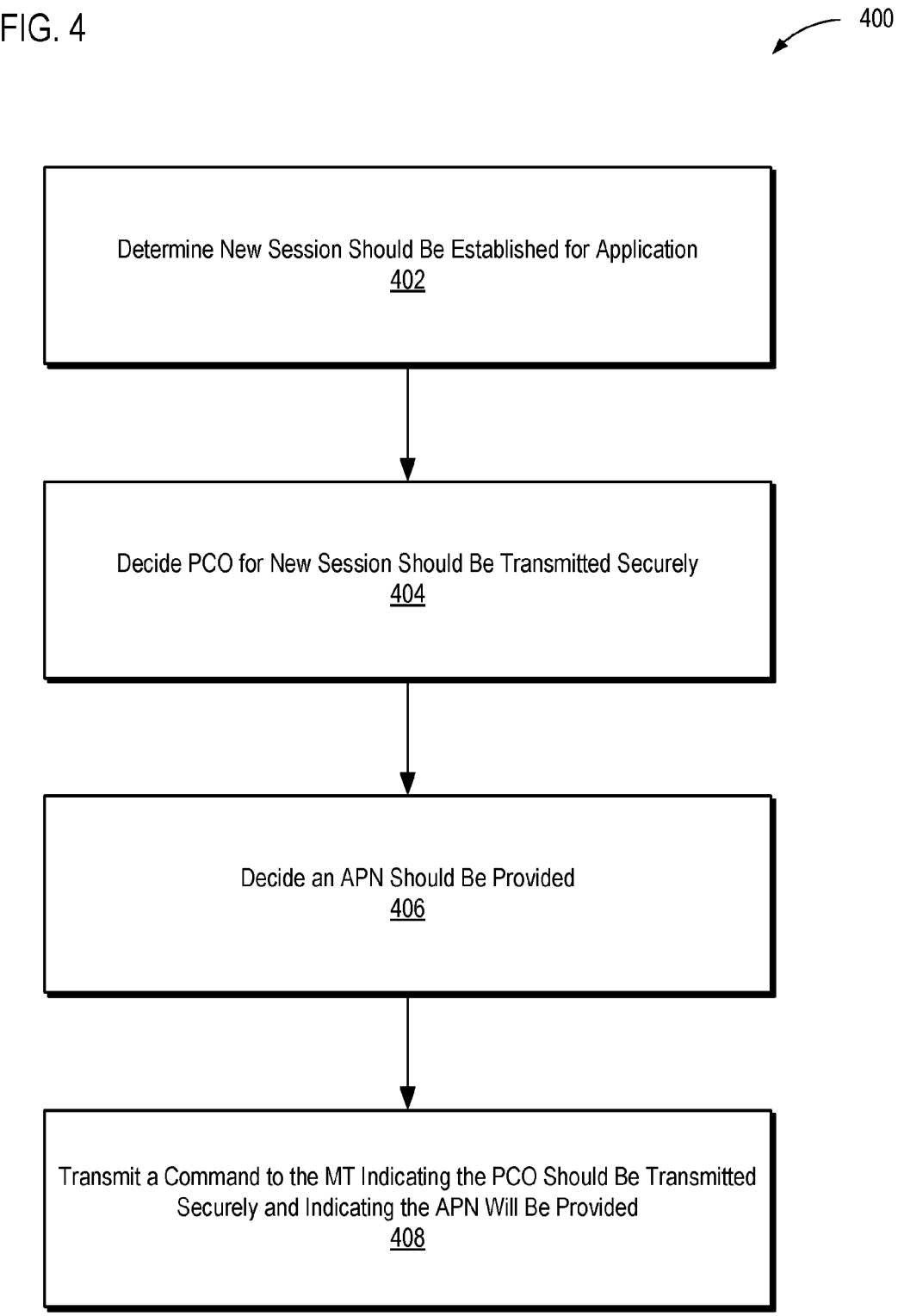
FIG. 4 is a flow diagram of an embodiment of a method for indicating to an MT whether an ESM information transfer flag should be set.

FIG. 4 is a flow diagram of an embodiment of a method 400 for indicating to an MT whether an ESM information transfer flag should be set. The method 400 may begin with determining 402 a new session should be established for an application. For example, it may be determined that a new PDN connection is required. The method 400 may also include deciding 404 whether PCO for the new session should be transmitted securely. For example, if an application needs to transmit a password or other sensitive information in the PCO, then it may be decided 404 that the PCO should be transmitted securely. The method 400 may include deciding 406 whether an APN should be provided. For example, it may be determined based on the requirements of an application that the APN should be provided.

A command may be transmitted 408 to the MT indicating whether the PCO should be transmitted securely and/or indicating that the APN will be provided. The command may be an AT command. In some embodiments, the command may be a dedicated command only including parameters related to secure transmission of the PCO and/or whether an APN will be provided. Alternatively, or in addition, the command may perform other functions as well. For example, the decision of whether to securely transmit the PCO may be specific to a particular PDN connection, and the command may include information about a particular PDN connection as well as a parameter indicating whether to securely transmit the PCO. In some embodiments, the command may indicate whether the APN will be provided by either including or omitting the APN and/or by either including a non-null value for the APN or including a null value. In various embodiments, the elements of the method 400 may be performed in alternate orders, such as deciding 406 whether an APN should be provided prior to deciding 404 whether PCO for the new session should be transmitted securely.

Figure 5:
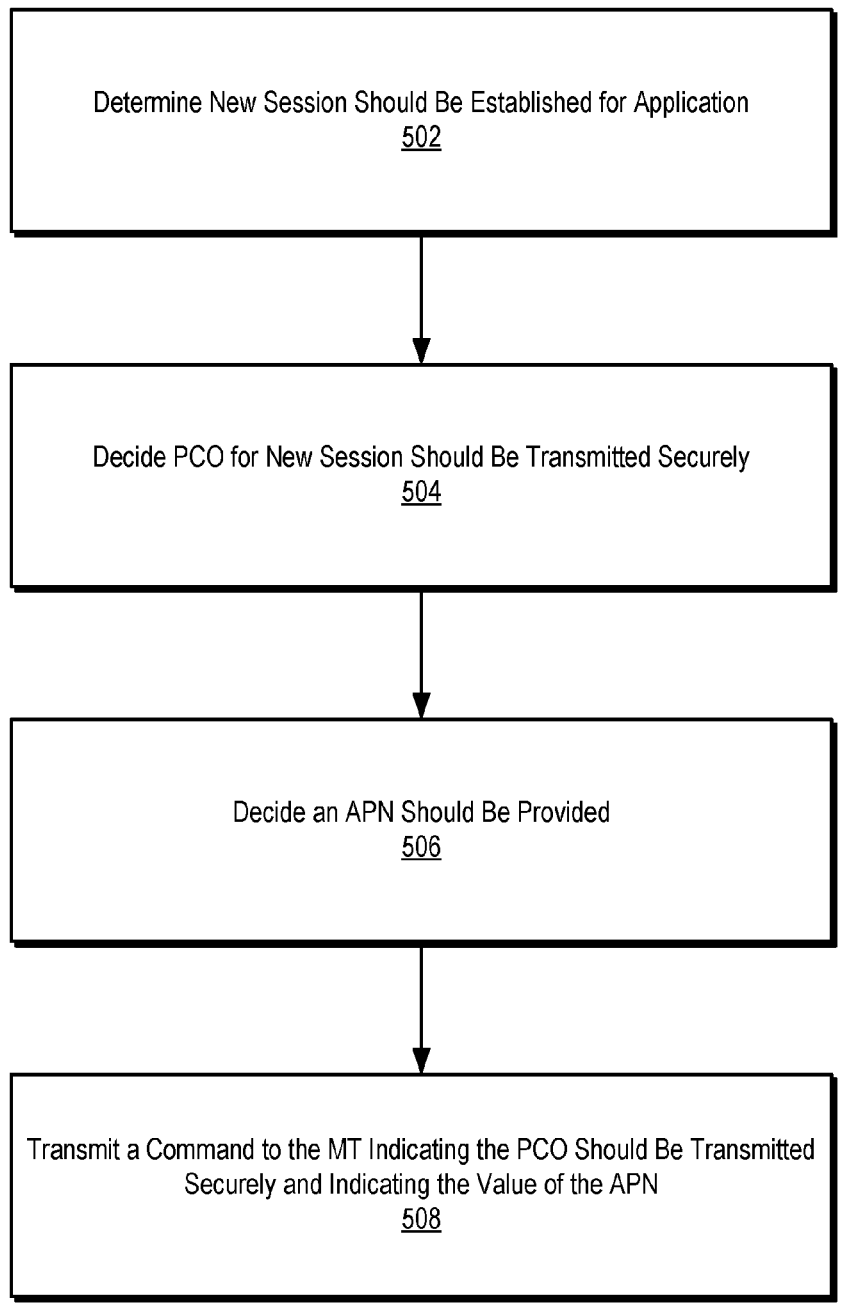
FIG. 5 is a flow diagram of another embodiment of a method for indicating to an MT whether an ESM information transfer flag should be set.

FIG. 5 is a flow diagram of another embodiment of a method 500 for indicating to an MT whether an ESM information transfer flag should be set. The method 500 again begins with determining 502 a new session should be established for an application. For example, it may be determined that a new PDN connection is required and that configuration information for the new PDN connection should be sent to the MT. The method 500 may include determining the configuration information to be sent to the MT. Specifically, the method 500 may include deciding 504 whether PCO for the new PDN connection should be transmitted securely. The method 500 may also include deciding 506 whether an APN should be provided. If it is decided that an APN should be provided, the value of the APN may be determined.

A command may be transmitted 508 to the MT indicating whether the PCO should be transmitted securely and/or indicating the value of the APN. If it is decided 506 that the APN should not be provided, the command may omit the value of the APN and/or any indication related to the APN. The omission of the APN may indicate to the MT that the APN does not need to be provided. The command may be an AT command, such as a +CGDCONT command, and may include additional information about the new PDN connection. As with the method 400, in various embodiments, the elements of the method 500 may be performed in alternate orders, such as deciding 506 whether an APN should be provided prior to deciding 504 whether PCO for the new session should be transmitted securely.

Figure 6:
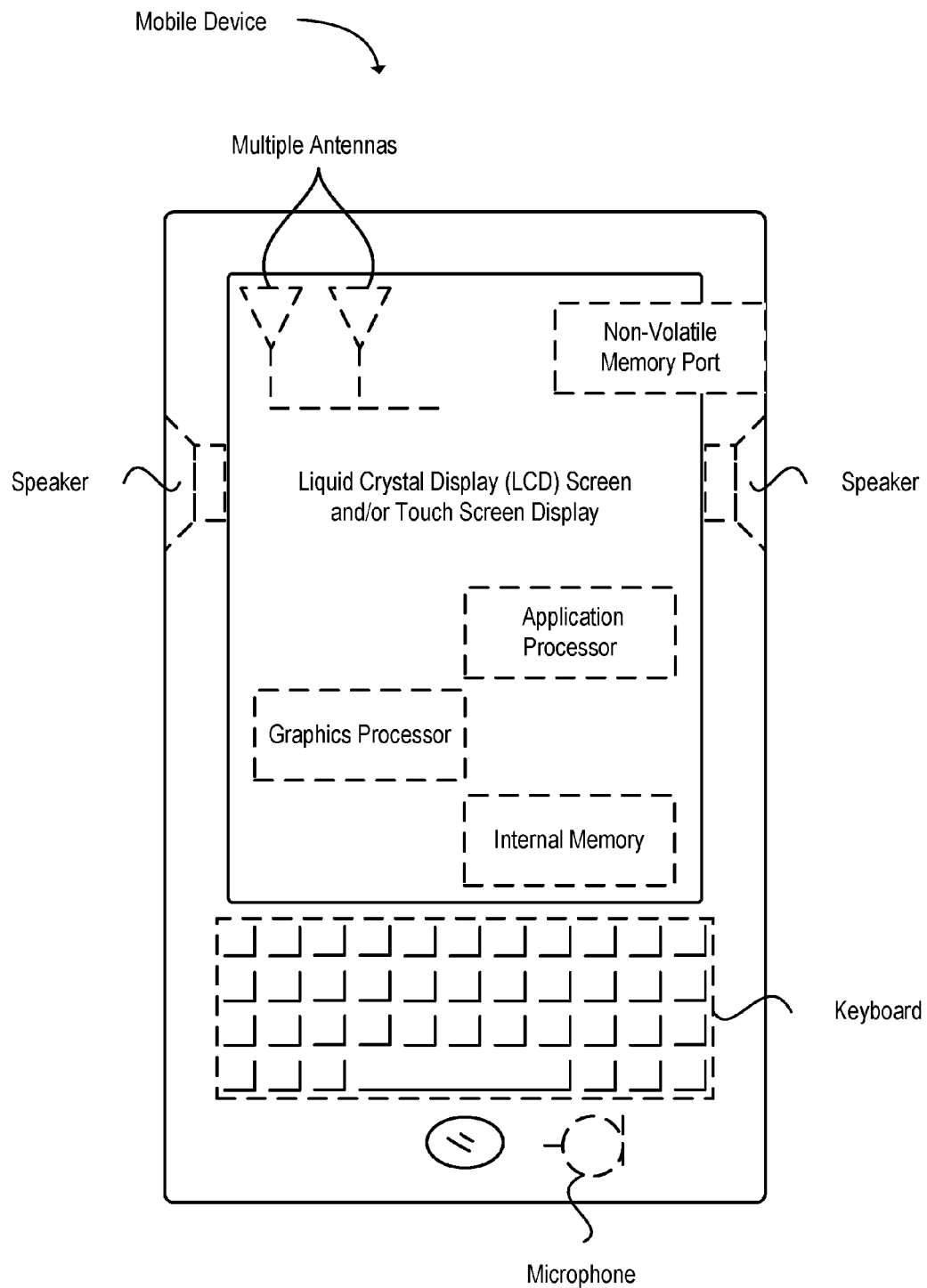
FIG. 6 is a schematic diagram of a UE able to transmit an AT command indicating whether Protocol Configuration Options (PCO) should transmitted securely and indicating whether an Access Point Name (APN) will be provided from a TE to an MT.

FIG. 6 is an example illustration of a mobile device, such as a UE, a mobile station (MS), a mobile wireless device, a mobile communication device, a tablet, a handset, or another type of wireless communication device. The mobile device can include one or more antennas configured to communicate with a transmission station, such as a base station (BS), an eNB, a base band unit (BBU), a remote radio head (RRH), a remote radio equipment (RRE), a relay station (RS), a radio equipment (RE), or another type of wireless wide area network (WWAN) access point. The mobile device can be configured to communicate using at least one wireless communication standard, including 3GPP LTE, WiMAX, high speed packet access (HSPA), Bluetooth, and Wi-Fi. The mobile device can communicate using separate antennas for each wireless communication standard or shared antennas for multiple wireless communication standards. The mobile device can communicate in a wireless local area network (WLAN), a wireless personal area network (WPAN), and/or a WWAN.

FIG. 6 also provides an illustration of a microphone and one or more speakers that can be used for audio input and output from the mobile device. The display screen may be a liquid crystal display (LCD) screen or other type of display screen, such as an organic light emitting diode (OLED) display. The display screen can be configured as a touch screen. The touch screen may use capacitive, resistive, or another type of touch screen technology. An application processor and a graphics processor can be coupled to internal memory to provide processing and display capabilities. A non-volatile memory port can also be used to provide data input/output options to a user. The non-volatile memory port may also be used to expand the memory capabilities of the mobile device. A keyboard may be integrated with the mobile device or wirelessly connected to the mobile device to provide additional user input. A virtual keyboard may also be provided using the touch screen.

EXAMPLES

The following examples pertain to further embodiments:

Example 1 is a TE configured to communicate with an MT. The TE includes circuitry configured to determine that PCO should be transmitted securely. The circuitry is also configured to transmit an AT command to the MT. The AT command includes an indication that the PCO should be transmitted securely.

In Example 2, the circuitry of Example 1 is configured to transmit an indication to the MT that an APN will be provided to the MT.

In Example 3, the AT command of any of Examples 1-2 is a CGSPTESMI command. The CGSPTESMI command includes a parameter indicating the PCO should be encrypted.

In Example 4, the AT command of any of Examples 1-2 is related to an individual PDN connection.

In Example 5, the AT command of Example 4 is a CGDCONT command with a parameter indicating the PCO should be encrypted.

In Example 6, the circuitry of any of Examples 1-5 is further configured to transmit a test command and receive a range of supported values for a parameter indicating whether the PCO should be encrypted.

In Example 7, the AT command of any of Examples 1-6 includes an APN.

Example 8 is a method for controlling a baseband processor with an application processor. The method includes determining, using the application processor, that a new session should be established for an application. The method also includes deciding, using the application processor, that PCO for the new session should be securely transmitted. The method also includes transmitting a command to the baseband processor. The command indicates the PCO should be securely transmitted.

In Example 9, transmitting the command of Example 8 includes indicating that an external packet data network name will be provided to the baseband processor.

In Example 10, transmitting the command of any of Examples 8-9 includes transmitting a dedicated command that indicates the PCO should be securely transmitted.

In Example 11, transmitting the command of any of Examples 8-10 transmitting a command related to an individual network connection.

In Example 12, transmitting the command related to the individual network connection of Example 11 includes transmitting routing information.

In Example 13, the method of any of Examples 8-12 also includes transmitting a test command and receiving a range of supported values for a parameter indicating whether the PCO should be securely transmitted.

In Example 14, the command of any of Examples 8-13 includes an external packet data network name.

In Example 15, the method of any of Examples 8-14 also includes in response to the command, transmitting, using the baseband processor, an indication to a cellular network that the baseband processor has ESM information requiring encryption to transmit to the cellular network.

In Example 16, the cellular network of Example 15 is a 3GPP LTE network. Transmitting the indication includes transmitting a PDN Connectivity Request message with an ESM Information Transfer Flag set.

Example 17 is an apparatus including means to perform a method as described in any of Examples 8-16.

Example 18 is at least one computer-readable storage medium having stored thereon computer-readable instructions, which when executed, implement a method or realize an apparatus as described in any preceding example.

Example 19 is a wireless communication device. The wireless communication device includes a modem. The wireless communication device also includes a terminal communicatively coupled to the modem. The terminal is configured to indicate to the modem that session information should be encrypted. The modem is configured to transmit encrypted session information to a base station.

In Example 20, the terminal of Example 19 is further configured to indicate to the modem that an external packet data network name will be provided to the modem.

In Example 21, the terminal of any of Examples 19-20 is configured to indicate that session information should be encrypted by transmitting a dedicated command indicating that the session information should be encrypted.

In Example 22, the terminal of any of Examples 19-21 is configured to indicate that session information should be encrypted by transmitting a command related to an individual network connection.

In Example 23, the terminal of Example 22 is configured to transmit routing information for the individual network connection.

In Example 24, the terminal of any of Examples 19-23 is configured to transmit a test command to the modem. The modem is configured to respond by transmitting to the terminal a range of values for indicating whether session information should be encrypted.

In Example 25, the terminal of any of Examples 19-24 is configured to transmit a read command to the modem. The modem is configured to transmit a response to the terminal indicating a value of a parameter indicating whether session information should be encrypted.

In Example 26, in response to the terminal of any of Examples 19-25 indicating that the session information should be encrypted, the modem is configured to transmit to the base station a connectivity request message that includes a flag indicating that the modem has session information requiring encryption to transmit to the base station.

Various techniques, or certain aspects or portions thereof, may take the form of program code (i.e., instructions) embodied in tangible media, such as floppy diskettes, CD-ROMs, hard drives, a non-transitory computer readable storage medium, or any other machine-readable storage medium, wherein, when the program code is loaded into and executed by a machine, such as a computer, the machine becomes an apparatus for practicing the various techniques. In the case of program code execution on programmable computers, the computing device may include a processor, a storage medium readable by the processor (including volatile and non-volatile memory and/or storage elements), at least one input device, and at least one output device. The volatile and non-volatile memory and/or storage elements may be a RAM, an EPROM, a flash drive, an optical drive, a magnetic hard drive, or another medium for storing electronic data. The eNB (or other base station) and UE (or other mobile station) may also include a transceiver component, a counter component, a processing component, and/or a clock component or timer component. One or more programs that may implement or utilize the various techniques described herein may use an application programming interface (API), reusable controls, and the like. Such programs may be implemented in a high-level procedural or an object-oriented programming language to communicate with a computer system. However, the program(s) may be implemented in assembly or machine language, if desired. In any case, the language may be a compiled or interpreted language, and combined with hardware implementations.

It should be understood that many of the functional units described in this specification may be implemented as one or more components, which is a term used to more particularly emphasize their implementation independence. For example, a component may be implemented as a hardware circuit comprising custom very large scale integration (VLSI) circuits or gate arrays, off-the-shelf semiconductors such as logic chips, transistors, or other discrete components. A component may also be implemented in programmable hardware devices such as field programmable gate arrays, programmable array logic, programmable logic devices, or the like.

Components may also be implemented in software for execution by various types of processors. An identified component of executable code may, for instance, comprise one or more physical or logical blocks of computer instructions, which may, for instance, be organized as an object, a procedure, or a function. Nevertheless, the executables of an identified component need not be physically located together, but may comprise disparate instructions stored in different locations that, when joined logically together, comprise the component and achieve the stated purpose for the component.

Indeed, a component of executable code may be a single instruction, or many instructions, and may even be distributed over several different code segments, among different programs, and across several memory devices. Similarly, operational data may be identified and illustrated herein within components, and may be embodied in any suitable form and organized within any suitable type of data structure. The operational data may be collected as a single data set, or may be distributed over different locations including over different storage devices, and may exist, at least partially, merely as electronic signals on a system or network. The components may be passive or active, including agents operable to perform desired functions.

Reference throughout this specification to "an example" means that a particular feature, structure, or characteristic described in connection with the example is included in at least one embodiment of the present disclosure. Thus, appearances of the phrase "in an example" in various places throughout this specification are not necessarily all referring to the same embodiment.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on its presentation in a common group without indications to the contrary. In addition, various embodiments and examples of the present disclosure may be referred to herein along with alternatives for the various components thereof. It is understood that such embodiments, examples, and alternatives are not to be construed as de facto equivalents of one another, but are to be considered as separate and autonomous representations of the present disclosure.

Although the foregoing has been described in some detail for purposes of clarity, it will be apparent that certain changes and modifications may be made without departing from the principles thereof. It should be noted that there are many alternative ways of implementing both the processes and apparatuses described herein. Accordingly, the present embodiments are to be considered illustrative and not restrictive, and the disclosure is not to be limited to the details given herein, but may be modified within the scope and equivalents of the appended claims.

Those having skill in the art will appreciate that many changes may be made to the details of the above-described embodiments without departing from the underlying principles of the disclosure. The scope of the present application should, therefore, be determined only by the following claims.

The invention claimed is:

1. An apparatus for a user equipment (UE), comprising:
a baseband processor;
an application processor communicatively coupled to the baseband processor, the application processor to:
determine to establish a new session for an application;
decide to securely transmit protocol configuration options (PCO) for the new session; and
communicate an attention (AT) command from the application processor to the baseband processor, wherein the AT command comprises a packet data protocol (PDP) context (CGDCONT) command with a parameter indicating a request to securely transmit the PCO to a mobility management entity (MME) of a cellular network.

2. The apparatus of claim 1, wherein the application processor is configured to generate a test command and receive, in response, a range of supported values for a parameter indicating whether the PCO should be securely transmitted.

3. The apparatus of claim 1, wherein the AT command includes an external packet data network name.

4. The apparatus of claim 1, wherein in response to the AT command, the baseband processor is configured to generate an indication for the cellular network that the baseband processor has evolved packet system (EPS) session management (ESM) information requiring encryption to transmit to the cellular network.

5. The apparatus of claim 4, wherein the baseband processor is further configured to generate a packet data network (PDN) connectivity request message with an ESM information transfer flag set.

6. The apparatus of claim 1, wherein the AT command is related to an individual network connection.

7. A mobile termination for a user equipment (UE), comprising:
one or more processors to:
process an attention (AT) command from a terminal communicatively coupled to the mobile termination, wherein the AT command comprises a packet data protocol (PDP) context (CGDCONT) command with a parameter to request a security protected transmission of protocol configuration options (PCO); and
in response to the request, generate encrypted session information to transmit to an access node of a wireless network.

8. The mobile termination of claim 7, wherein the mobile termination is configured to receive, from the terminal, a test command, and wherein the one or more processors of the mobile termination are configured to respond by generating a range of values to indicate whether session information should be encrypted.

9. The mobile termination of claim 7, wherein mobile termination is configured to receive, from the terminal, a read command, and wherein the one or more processors of the mobile termination are configured to respond to the read command with a value of a parameter indicating whether session information is to be encrypted.

10. The mobile termination of claim 7, wherein in response to the AT command, the one or more processors are configured to generate a connectivity request message that includes a flag indicating that the mobile termination has session information requiring encryption to transmit to the access node of the wireless network.

11. The mobile termination of claim 7, wherein the AT command is related to an individual network connection.

12. At least one non-transitory computer-readable storage medium having stored thereon computer-readable instructions to, when executed, control one or more processors to:
determine that a mobile terminal (MT) is to provide protocol configuration options (PCO) securely to a mobile management entity (MME) of a wireless network;
generate an attention (AT) command, wherein the AT command comprises a packet data protocol (PDP) context (CGDCONT) command with a parameter to indicate that security protected transmission of the PCO is requested; and
communicate the AT command to the MT.

13. The at least one non-transitory computer-readable storage medium of claim 12, wherein the instructions are further to:
transmit a test command; and
receive a range of supported values for a parameter indicating whether the PCO should be encrypted.

14. An apparatus for user equipment (UE), comprising:
a mobile termination (MT) comprising a baseband processor to generate a message comprising protocol configuration options (PCO) to send to a mobility management entity (MME) of a wireless communication network; and
a terminal equipment comprising an application processor to:
determine that the PCO are to be transmitted securely; and
generate an attention (AT) command to communicate to the MT, wherein the AT command comprises a packet data protocol (PDP) context (CGDCONT) command with a parameter indicating that security protected transmission of the PCO is requested.

15. The apparatus of claim 14, wherein the terminal equipment is further configured to transmit a test command and receive a range of supported values for a parameter indicating whether the PCO should be encrypted.

16. The apparatus of claim 14, wherein the AT command includes an Access Point Name (APN).

* * * * *